(12) United States Patent
Hulbert et al.

(10) Patent No.: US 11,474,842 B2
(45) Date of Patent: Oct. 18, 2022

(54) INTEGRATION APPLICATION CREATOR DESIGN

(71) Applicant: ServiceNow, Inc., Santa Clara, CA (US)

(72) Inventors: Grant Hulbert, San Marcos, CA (US); Michael Thompson, Waukesha, WI (US)

(73) Assignee: ServiceNow, Inc., Santa Clara, CA (US)

( * ) Notice: Subject to any disclaimer, the term of this patent is extended or adjusted under 35 U.S.C. 154(b) by 315 days.

(21) Appl. No.: 16/748,927

(22) Filed: Jan. 22, 2020

(65) Prior Publication Data

US 2020/0241896 A1 Jul. 30, 2020

Related U.S. Application Data

(63) Continuation of application No. 16/673,596, filed on Sep. 17, 2019, now Pat. No. 11,232,953, which is a continuation of application No. 16/055,690, filed on Aug. 6, 2018, now Pat. No. 10,816,609, which is a continuation of application No. 15/588,135, filed on May 5, 2017, now Pat. No. 10,042,618.

(51) Int. Cl.
| | |
|---|---|
| *G06F 9/455* | (2018.01) |
| *G06F 9/451* | (2018.01) |
| *G06F 9/54* | (2006.01) |
| *G06F 9/50* | (2006.01) |
| *H04L 41/50* | (2022.01) |
| *H04L 61/5076* | (2022.01) |

(52) U.S. Cl.
CPC .......... *G06F 9/453* (2018.02); *G06F 9/5072* (2013.01); *G06F 9/541* (2013.01); *H04L 41/5083* (2013.01); *H04L 41/5096* (2013.01); *H04L 61/2076* (2013.01)

(58) Field of Classification Search
CPC ...................................................... G06F 9/455
See application file for complete search history.

(56) References Cited

U.S. PATENT DOCUMENTS

| | | | |
|---|---|---|---|
| 5,978,594 A | 11/1999 | Bonnell | |
| 6,321,229 B1 | 11/2001 | Goldman | |
| 6,363,081 B1 * | 3/2002 | Gase | ............ H04L 29/06 370/464 |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |

(Continued)

*Primary Examiner* — Jae U Jeon
(74) *Attorney, Agent, or Firm* — Fletcher Yoder PC

(57) ABSTRACT

Application generation and integration application generation methods are disclosed. An application generation function includes automatically providing a set of software artifacts to an application developer that may be used as an aid to providing an application with augmented capabilities for an end-user. The augmented capabilities configured to adhere to certain rules regarding certification criteria and requirements of a multi-tenant cloud infrastructure. Generated applications and plug-in capabilities may further be required to meet certification criteria applicable to an application store hosted within a cloud infrastructure.

20 Claims, 6 Drawing Sheets

(56) References Cited

U.S. PATENT DOCUMENTS

| | | |
|---|---|---|
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,346,752 B2 | 1/2013 | Slrota |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,659,051 B2 | 4/2017 | Hutchins |
| 9,645,833 B2 | 5/2017 | Mueller |
| 9,654,473 B2 | 5/2017 | Miller |
| 9,766,935 B2 | 9/2017 | Kelkar |
| 9,773,253 B2 * | 9/2017 | Nikolayev ........... G07F 17/3225 |
| 9,792,387 B2 | 10/2017 | George |
| 9,805,322 B2 | 10/2017 | Kelkar |
| 9,852,165 B2 | 12/2017 | Morozov |
| 9,911,087 B1 | 3/2018 | Henderson |
| 9,923,865 B1 | 3/2018 | Wei |
| 9,967,162 B2 | 4/2018 | Spinelli |
| 10,002,203 B2 | 6/2018 | George |
| 2005/0198121 A1 * | 9/2005 | Daniels ................. G06Q 10/10 |
| | | 709/203 |
| 2005/0251507 A1 * | 11/2005 | Woollen ................. G06F 9/546 |
| 2007/0021955 A1 * | 1/2007 | Tolone ................... G06F 30/20 |
| | | 703/22 |
| 2007/0024645 A1 * | 2/2007 | Purcell ................. G06F 3/1431 |
| | | 345/634 |
| 2007/0106980 A1 * | 5/2007 | Felts ................... G06F 9/44536 |
| | | 717/124 |
| 2012/0109790 A1 * | 5/2012 | Bhatia ................... G06Q 10/10 |
| | | 705/30 |
| 2012/0109984 A1 | 5/2012 | Clark, Jr. et al. |
| 2013/0326471 A1 * | 12/2013 | Nucci ................. G06F 11/3664 |
| | | 717/105 |
| 2014/0282358 A1 | 9/2014 | Mowatt et al. |
| 2018/0081374 A1 | 3/2018 | Nimchuk et al. |

* cited by examiner

INTEGRATION APPLICATION CREATOR DESIGN

CROSS REFERENCE TO RELATED APPLICATIONS

This application is a continuation of U.S. patent application Ser. No. 16/673,596, filed on Nov. 4, 2019; which is a continuation of U.S. patent application Ser. No. 16/055,690 filed Aug. 6, 2018 (now U.S. Pat. No. 10,466,973); which is a continuation of U.S. patent application Ser. No. 15/588,135 filed May 5, 2017 (now U.S. Pat. No. 10,042,618); the contents of each are incorporated herein in their entirety by reference.

TECHNICAL FIELD

Embodiments described herein generally relate to cloud computing and in particular disclosed embodiments allow for creating, using code generation techniques, applications that integrate between applications of different providers and are in conformance with certification criteria as may be required for an application store.

BACKGROUND ART

Cloud computing relates to the sharing of computing resources that are generally accessed via the Internet. In particular, cloud computing infrastructure allows users to access a shared pool of computing resources, such as servers, storage devices, networks, applications, and/or other computing based services. By doing so, users, such as individuals and/or enterprises, are able to access computing resources on demand that are located at remote locations in order to perform a variety computing functions that include storing and/or processing computing data. For enterprise and other organization users, cloud computing provides flexibility in accessing cloud computing resources without accruing up-front costs, such as purchasing network equipment, and investing time in establishing a private network infrastructure. Instead, by utilizing cloud computing resources, users are able redirect their resources to focus on core business functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of business and/or information technology (IT) related software via a web browser. PaaS acts as an extension of SaaS that goes beyond providing software services by offering customizability and expandability features to meet a user's needs. For example, PaaS can provide a cloud based developmental platform for users to develop, modify, and/or customize applications and/or automating business operations without maintaining network infrastructure and/or allocating computing resources normally associated with these functions.

Within the context of automating business, IT, and/or other organization-related functions (e.g., incident tracking (help desk)), PaaS often provides users an array of tools to implement complex behaviors, such as business rules, scheduled jobs, events, and scripts, to build automated processes and to integrate with third party systems.

Although the tools for a PaaS generally offer users a rich set of facilities for building automated processes for various business, IT, and/or other organization-related functions, users typically have a desire to integrate application suites from different vendors to perform an automated process. In some examples, legacy systems are integrated with newer systems to provide a transition path forward without having to replace all systems at the same time. These integration capabilities may be provided by customized scripts but may also be provided by a partner to one or both of the original application providers. In some cases, the provider of the integration is not directly related to either original application provider. The integration provider may address a need for a single or a small set of customers that desire capability not available in the standard offering. As such, continually improving the technology of developmental platforms that simplify the process for partners to make available added value integrations, plug-ins, or augmented applications remains valuable in enhancing clouding computing services.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed below.

In one embodiment, a cloud based computer system, includes a memory partition; and a network interface communicatively coupled to the memory partition and one or more processing units, wherein the memory partition comprises computer instructions that when executed by the one or more processing units cause the cloud-based computer system to: execute a hosted partner instance that is communicatively coupled, via the network interface, with a remotely executing partner application, the hosted partner instance configured to execute an application generator; receive an indication, via the application generator, of a primary application and an integration-type for the primary application, and a secondary application; automatically generate, by the application generator, a set of artifacts for the secondary application as a scoped application having a target functionality based on the primary application and the integration-type, wherein the secondary application is configured to execute within a hosted customer instance executing an instance of the primary application and provide for integration between the primary application and another application; wherein the secondary application is configured to interface with the primary application only through a public interface of the primary application, and wherein the secondary application includes all of the program code and graphic elements required to provide the target functionality.

In another embodiment, A multi-instance cloud system, includes a non-transitory memory; and one or more hardware processors configured to execute instructions from the non-transitory memory to cause the multi-instance cloud system to: determine an integration application creator functionality exists on a partner instance; identify a plurality of artifacts automatically generated by the integration application creator; generate a partner integration application configured to execute on a customer instance, the partner integration application scoped based at least on the plurality of artifacts, wherein the partner integration application is further scoped with limited access to a plurality of system resources; and enable the generated partner integration application to function on the customer instance in conformance with scoping based at least on the limited access to the plurality of system resources.

In yet another embodiment, A method of generating a scoped application includes receiving an indication of a primary application and an integration-type for a generated scoped integration application within an application generator executing in a hosted partner instance of a multi-instance cloud computing system; generating a set of artifacts for the generated scoped application, the set of artifacts configured for a target functionality based on the primary application and the integration-type, wherein the generated scoped application is configured to execute within a hosted customer instance executing an instance of the primary application and provide for integration between the primary application and another application; and receiving additional input for the generated set of artifacts, the additional input defining integration information for the another application, wherein the generated scoped application is configured to interface between the another application and the primary application, the generated scoped application interfacing with the primary application only through a public interface of the primary application.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
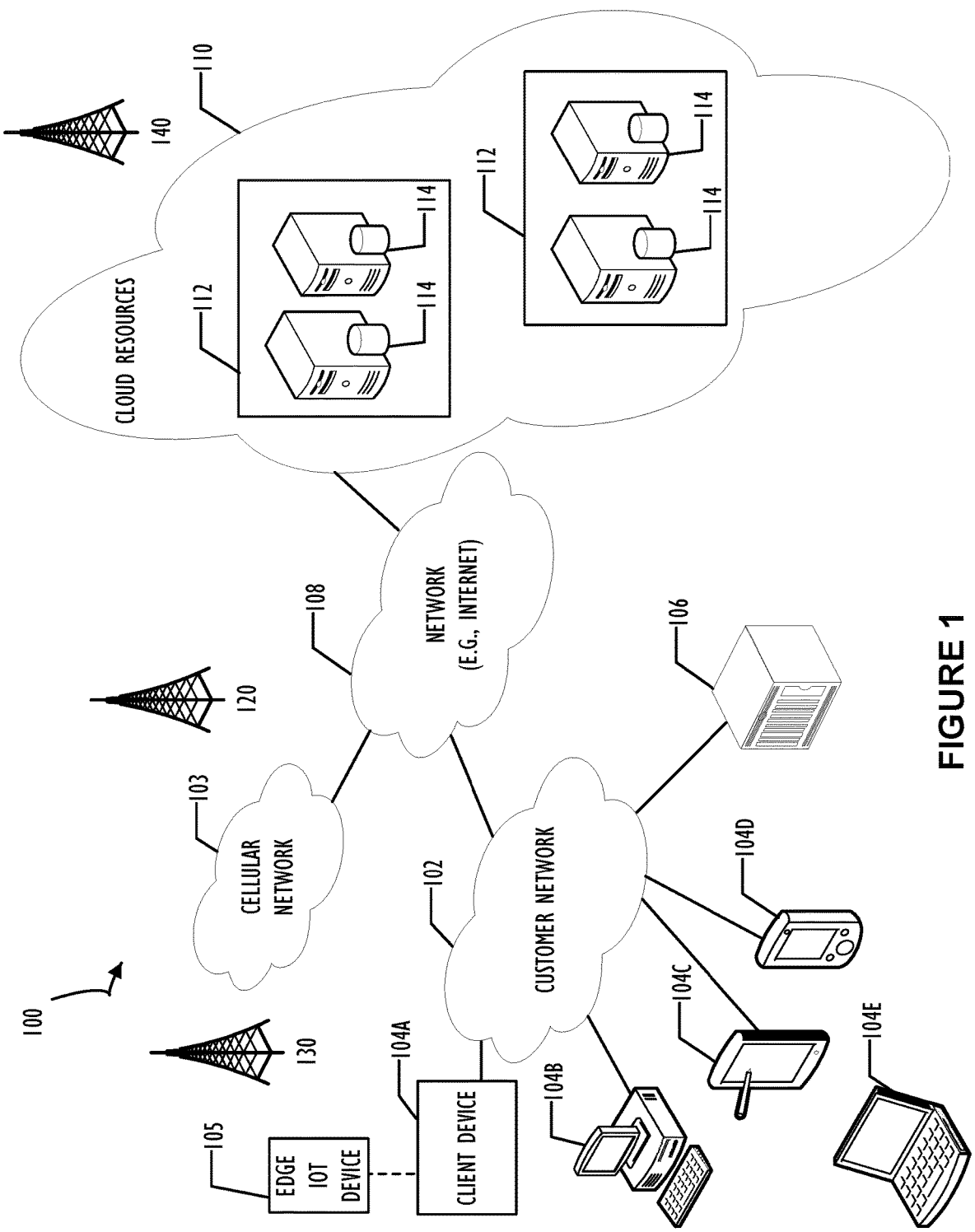
FIG. 1 illustrates a block diagram of an embodiment of a cloud computing infrastructure 100 where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "plug-in" refers to one or more computing modules, programs, processes, workloads, threads and/or set of computing instructions executed from within the context of another application. Example embodiments of a plug-in module includes adding a capability to a standard application to augment that standard application's capability from what it was prior to installing the plug-in module. For example, adding a reader function that understands how to read a format that could previously not be read by the initial application prior to plug-in.

As used herein, the term "integration application" refers to a computer application configured to interface between applications (or application suites) from different providers and/or that may have different application architectures. By way of example, an integration application may function as a bridge between two different application suites, likely from two different vendors, used to support a single business solution. In one example, end-users may utilize a single interface to receive/send information from both application suites or one application suite may receive/send information, via the integration application, to and from the other. In a specific example, one provider may be responsible for a Configuration Management Data Base (CMDB) and a second provider may be responsible for Incident Management (helpdesk), while the integration application allows the helpdesk functionality to interface with the CMDB for an overall business solution.

As used herein, the term "application generator" refers to a computer application configured to receive inputs defining parameters of a previously non-existent computer application (or plug-in) and, via an automated process, provide, as output, a set of artifacts for a new computer application consistent with requirements as defined by the input defining parameters. According to some disclosed embodiments, the "generated application" may be "scoped" such that the application follows scoping rules regarding data access and confinement. For example, a properly scoped application executing in a customer instance of a cloud computing system will not access or manipulate information from any other customer's instance on the same cloud computing system. Further, according to some disclosed embodiments, the "generated application" may be certification compliant such that the application conforms to compliancy rules that may be in place for an application store that makes the application available to a plurality of customers.

Various example embodiments are disclosed herein that allow partner application providers to create and make available integration applications that may comprise augmented applications (or plug-ins) that customers may add to their execution environments as provided by a cloud service provider. In one example, a partner navigates to the Create Scope page within their hosted partner instance, fills out given fields and submits for the integration application to be created. Once the creation process is started, a UI Script may be run using the same functionality as creating a scoped application and, in addition, also calls a REST API which triggers a script-include function to run. This function creates all the artifacts in a series of other functions, but ensures that everything created is captured within the newly created scoped app. Once the process is complete, the partner can navigate to a documentation page, edit in an editor such as a development Studio, or close the window. At this point, the application generator has created the foundation for an incident or security incident integration application that may be submitted for certification, unless there are any other changes needed to be made. After certification is complete the newly created application (e.g., integration application) may be made available to customers via an application store maintained by the cloud service provider. In typical cases, the partner may add additional information in the form of code, business logic, scripting, etc. to the initially generated integration application prior to submitting the integration application for certification.

FIG. 1 illustrates a block diagram of an embodiment of a cloud computing infrastructure 100 where embodiments of the present disclosure may operate. Cloud computing infrastructure 100 comprises a customer network 102, network 108, and a cloud resources platform/network 110. In one embodiment, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi (ID networks (Wi-Fi is a registered trademark of the Wi-Fi Alliance), Bluetooth® (BLUETOOTH is a registered trademark of Bluetooth Special Interest Group)). In another embodiment, customer network 102 represents an enterprise network that could include or be communicatively coupled to one or more local area networks (LANs), virtual networks, data centers and/or other remote networks (e.g., 108, 112). As shown in FIG. 1, customer network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 includes a local compute resource 106 that may include a server, access point, router, or other device configured to provide for local computational resources and/or facilitate communication amongst networks and devices. For example, local compute resource 106 may be one or more physical local hardware devices configured to communicate with wireless network devices and/or facilitate communication of data between customer network 102 and other networks such as network 108 and cloud resources platform/network 110. Local compute resource 106 may also facilitate communication between other external applications, data sources, and services, and customer network 102. Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact other mobile devices or with non-mobile devices such as desktop computer 104B and various types of client device 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WAN), the Internet, and/or other remote networks, in order to transfer data between client devices 104A-D and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio based network as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via customer network 102 and network 108. The cloud resources platform/network 110 acts as a platform that provides additional computing resources to the client devices 104A-E and/or customer network 102. For example, by utilizing the cloud resources platform/network 110, users of client devices 104A-E may be able to build and execute applications, such as automated processes for various business, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java Virtual Machine), and/or a database server instance (e.g., a unitary MySQL catalog).

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causes outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the cloud resources platform/network 110, and customer-driven upgrade schedules. An example of implementing a customer instance within a multi-instance cloud architecture will be discussed in more detail below when describing FIG. 2.

In one embodiment, utilizing a multi-instance cloud architecture, a first customer instance is configured as a partner instance "P-instance" and a second customer instance is configured as a "C-instance," where the C-instance is for a customer instance utilizing an application service from the cloud service provider (e.g., SaaS). One difference between the P-instance and the C-instance, in this embodiment, is that the P-instance includes an Application Generator application as disclosed herein. The Application Generator application can assist the "partner" to create augmented applications for use in one or more traditional C-instances. That is, the partner utilizes their P-instance to create additional software offerings for customers of the cloud service provider via an application store facility of the cloud service provider. These additional software offerings may be in the form of integration applications that allow different application suites or functions to interact with each other. Details of this will be discussed below with reference to FIGS. 3-5.

Figure 2:
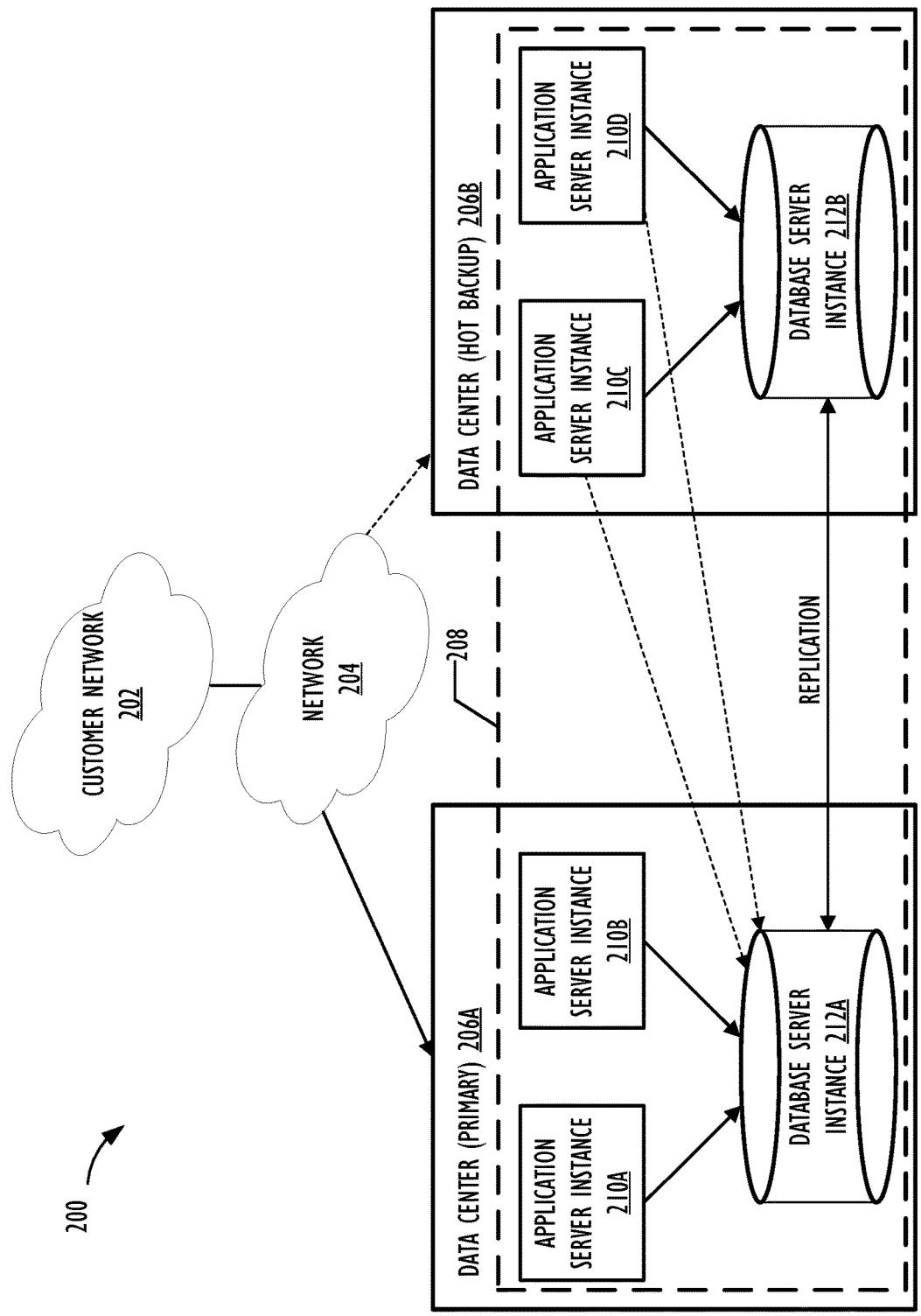
FIG. 2 illustrates a block diagram of an embodiment of a multi-instance cloud architecture 200 where embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a customer network 202 that connects to two data centers 206a and 206b via network 204. Customer network 202 and network 204 may be substantially similar to customer network 102 and network 108 as described in FIG. 1, respectively. Data centers 206a and 206b can correspond to FIG. 1's data centers 112 located within cloud resources platform/network 110. Using FIG. 2 as an example, a customer instance 208 is composed of four dedicated application server instances 210a-210d and two dedicated database server instances 212a and 212b. Stated another way, the application server instances 10a-210d and database server instances 212a and 212b are not shared with other customer instances 208. Other embodiments of the multi-instance cloud architecture 200 could include other types of dedicated server instances, such as a web server instance. For example, the customer instance 208 could include the four dedicated application server instances 210a-210d, two dedicated database server instances 212a and 212b, and four dedicated web server instances (not shown in FIG. 2).

To facilitate higher availability of the customer instance 208, application server instances 10a-210d and database server instances 212a and 212b are shown to be allocated to two different data centers 206a and 206b, where one of data centers 206 may act as a backup data center. In reference to FIG. 2, data center 206a acts as a primary data center that includes a primary pair of application server instances 210a and 210b and primary database server instance 212a for customer instance 208, and data center 206b acts as a secondary data center to back up primary data center 206a for a customer instance 208. To back up primary data center 206a for customer instance 208, secondary data center 206 includes a secondary pair of application server instances 210c and 210d and a secondary database server instance 212b. Primary database server instance 212a is able to replicate data to secondary database server instance 212b. As shown in FIG. 2, primary database server instance 212a replicates data to secondary database server instance 212b using a replication operation such as, for example, a Master-Master MySQL, Binlog replication operation. The replication of data between data centers could be implemented in real time or by implementing full backup weekly and daily incremental backups in both data centers 206a and 206b. Having both a primary data center 206a and secondary data center 206b allows data traffic that typically travels to the primary data center 206a for the customer instance 208 to be diverted to the second data center 206b during a failure and/or maintenance scenario. Using FIG. 2 as an example, if application server instances 210a and 210b and/or primary data server instance 212a fails and/or is under maintenance, data traffic for customer instances 208 can be diverted to secondary application server instances 210c and 210d and secondary database server instance 212b for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only examples to facilitate ease of description and explanation.

Figure 3:
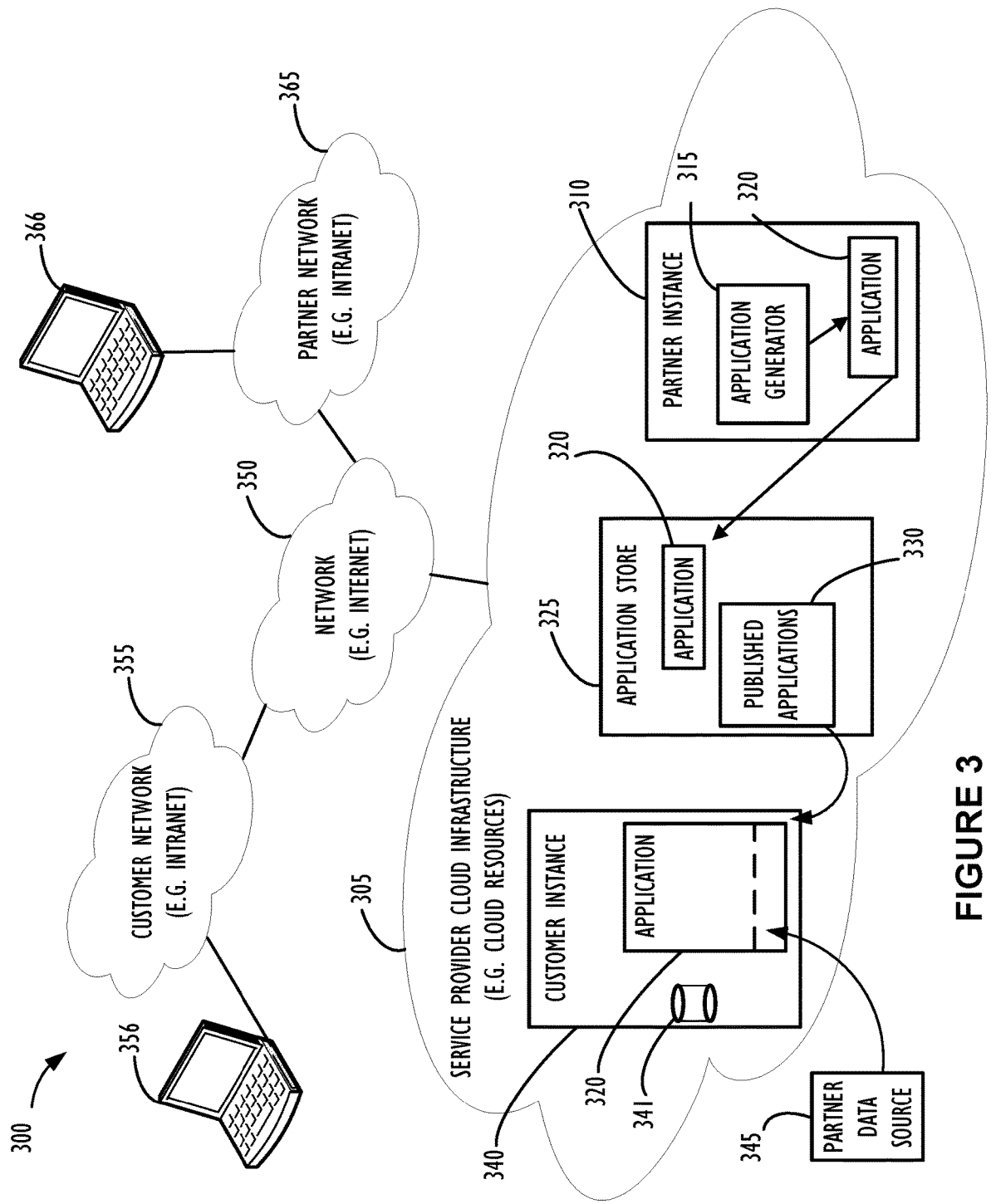
FIG. 3 illustrates a block diagram 300 of an embodiment of a service provider cloud infrastructure 305 and supporting network environment that may collectively be used to support the application integration generator 315 of the present disclosure for creating a scoped integration application 320 and making it available via an application store 325.

FIG. 3 illustrates a block diagram 300 of an embodiment of a service provider cloud infrastructure 305 and supporting network environment that may be used to support the application generator 315 of the present disclosure for creating a scoped application 320 and making it available via an application store 325. Block diagram 300 illustrates an example of a service provider cloud infrastructure 305 (e.g., cloud resources) connected via a network 350 such as the Internet to a customer network 355. Users (e.g., end-users) of customer network 355 may utilize a customer device 356 to provide a user interface to network applications via a web browser as an example. Network 350 is a further example of a network such as network 108 of FIG. 1 and network 204 of FIG. 2. Customer network 355 is a further example of a network such as network 102 of FIG. 1 and network 202 of FIG. 2. Details of these networks are discussed above with reference to each of FIGS. 1 and 2 and are not discussed further here. Service provider cloud infrastructure 305 illustrates cloud resources and server instances similar to those explained with respect to FIG. 2 but configured here to support a partner to a cloud service provider such that the partner can provide integration software applications having capabilities different from those offered solely by the cloud service provider.

Service provider cloud infrastructure 305 includes partner instance 310 ("P-Instance"), customer instance 340 ("C-Instance") and application store 325. Although service provider cloud instance 305 illustrates only a single C-Instance and a single P-Instance, this is only for simplicity of the figure. In typical embodiments, there may be many C-Instances, several P-Instances, and a number of application store 325 instances. As described briefly above, a C-Instance represents a server instance for a particular customer of the cloud service provider and the customer may be utilizing one or more applications (not shown) from the cloud service provider in a SaaS model. One C-Instance 310 may support many end-users working for the customer associated with the C-Instance 310. These end-users may access C-Instance 310 using client device 356 which is similar to devices 104A-E as illustrated in FIG. 1. P-Instance 310 is similar to C-Instance 340 in that they are both server instances within service provider cloud infrastructure 305, however, P-Instance 310 may have additional and/or different software applications available within the instance. One such additional capability, present in P-Instance 310 and not present in C-Instance 340, is illustrated by application generator 315 application. Application generator 315 and methods of its use are further discussed throughout this disclosure. The end-users associated with P-Instance 310 may interact through network 350, partner network 365, and partner client device 366 in a similar manner to customer end-users interacting with C-Instance 310.

In this embodiment, a partner of the cloud service provider is responsible for P-Instance 310 via networks 350 and 365 and an end-user using client device 366 via a web application interface to functions executing within P-Instance 310. In this example, the partner provides integration software applications made available through application store 325 to SaaS customers. That is, customers may pay or otherwise acquire functionality from both the cloud service provider and from the application store 325 (e.g., partner integration applications) for use in their C-Instance 340. The cloud service provider is ultimately responsible for the availability, integrity, and functionality of each C-Instance 340. Accordingly, the cloud service provider may require that partner provided applications are certified and meet specific design criteria prior to being made available via application store 325. This certification criteria may be extensive and include, for example, that applications are properly designed as "scoped applications" such that they do not access or interfere with anything beyond the logical boundaries of a particular C-Instance in which they are intended to execute. To this end, a cloud service provider may assist partners in creating and maintaining applications (or plug-ins) that are to be made available via application store 325. As shown in FIG. 3, P-Instance 310 includes an application generator 315 that is used to create application 320. In one or more embodiments, application generator 315 may be constructed to receive input information from a customer (in this case the partner) and to utilize the input information to output a basic application that conforms to all certification criteria and is a properly scoped application. After generation, in some embodiments, the partner may work within their P-Instance 310 to further add functionality (business logic) to the generated application and create application 320 which is a scoped and certifiable application capable of performing operations not necessarily available in the cloud service provider's standard offerings. In one example, the partner has extensive domain knowledge of a third-party application that requires integration to interact with a software offering of the cloud service provider. In this example, application generator 315 has built in domain knowledge of one or more applications provided by the cloud service provider. Accordingly, a partner may utilize application generator to generate an integration application that provides for interconnectivity and interaction between a selected set of applications provided by the cloud service provider and the third party application. For example, the integration may be between a help desk offering of the cloud service provider and a CMDB of a third party provider. In this example, the partner provides the necessary additional domain knowledge of the CMDB interfaces and application generator 315 provides hooks necessary to easily integrate to the help desk application.

Once a partner finalizes updates to application 320, which was initially output from application generator 315, application 320 may be published to application store 325 and made available as part of additional offerings of the cloud service provider along with other previously published applications 330. A customer wanting to utilize application 320 and its augmented functionality (as provided by the partner) may load application 320 into their C-Instance 340 and allow it access to information in a data store 341 that is part of their server instance. Additionally, a partner data source 345 may be made available for use with generated application 320 to assist with execution of the augmented functionality while application 320 is executing within the customers C-Instance 340. As illustrated in FIG. 3 and explained here, application 320 is a properly scoped application and interactions with partner data source 345 may be strictly controlled. An example process flow of application definition, generation, publishing, and loading into a C-Instance are discussed in more detail in FIG. 4.

Figure 4:
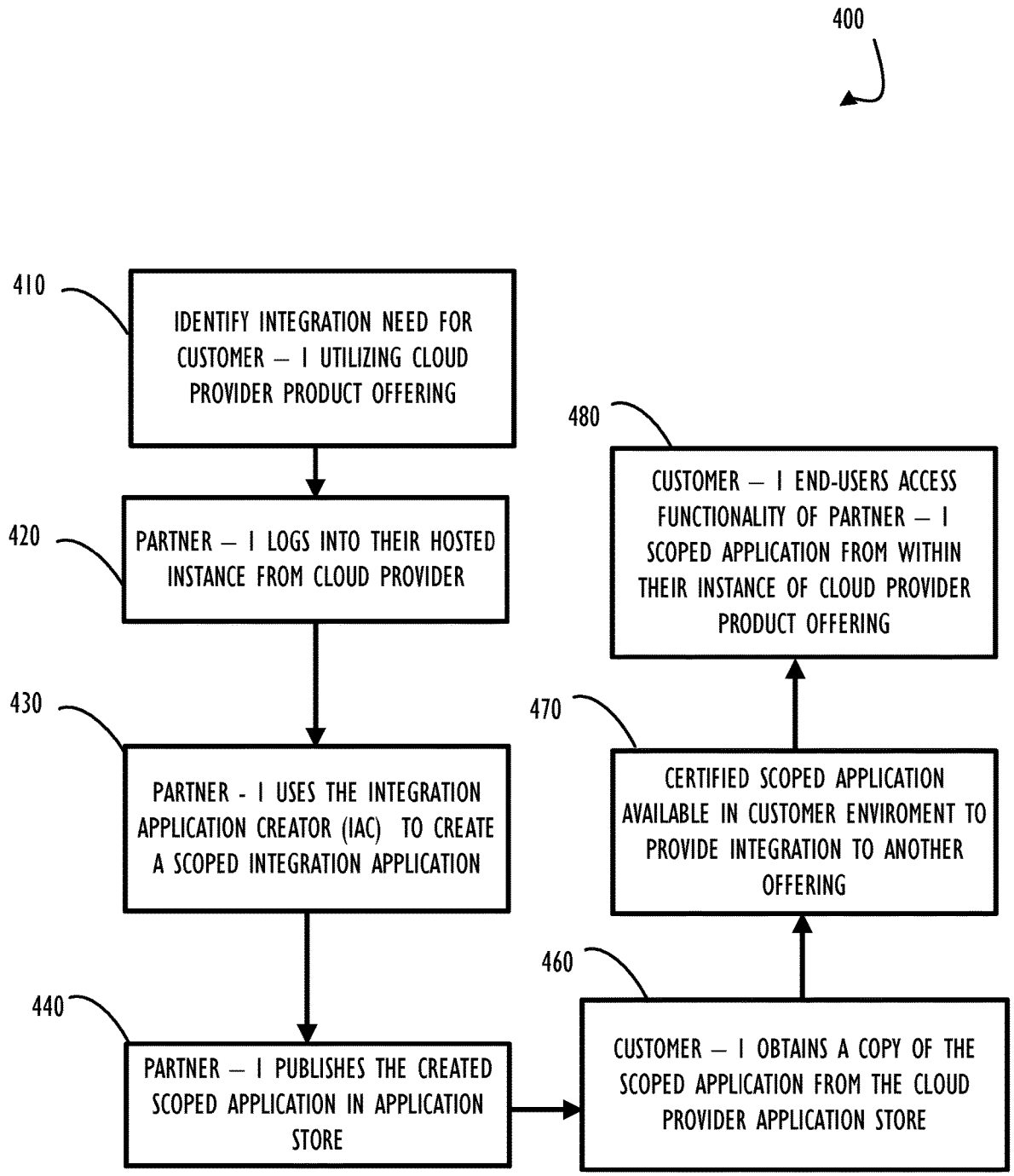
FIG. 4 illustrates a flowchart of an embodiment of a method 400 of interaction between a customer of a service provider, a partner integration application developer that creates a customized scoped integration application, and a cloud service provider according to one or more disclosed embodiments.

FIG. 4 illustrates a flowchart of an embodiment of method 400 explaining one possible interaction scenario between a customer of a service provider (e.g., customer with C-Instance 340), a partner application developer (e.g., a partner with a P-Instance 310), and a cloud service provider (e.g., cloud service provider with application store 325) according to one or more disclosed embodiments. Method 400 may generate and publish scoped application definitional inputs that are processed using hardware, software, or both. Using FIG. 3 as an example, method 400 may be implemented on service provider cloud infrastructure 305 using C-Instance 340, P-Instance 310, and application store 325. Although FIG. 4 illustrates that the blocks of method 400 are implemented in a sequential operation, other embodiments of method 400 may have one or more blocks implemented in parallel operations or in a series of operations performed in a different order than shown.

Method 400 begins at block 410 with identification of an integration application need for customer 1 (e.g., customer 1 or one of many potential customers) utilizing their customer instance (e.g., C-Instance 340). The integration need may be, for example, an integration between a helpdesk application provided by the cloud service provider and a CMDB already present within the customer network. In this example there is a need for an integration application to be provided by partner 1. The integration application may be customized by partner 1 with augmented capability that may not be available from standard or current offerings of the cloud service provider. In some cases, the augmented capability described here may be capability to integrate between application suites and functionality provided by different providers. At block 420, partner 1 logs into their hosted instance from the cloud service provider (e.g., a P-Instance 310). As explained above, a partner instance in this example has available an application generator or an integration application creator (IAC) software application (e.g., examples of application generator 315) within their P-Instance. At block 430, partner 1 uses the integration application creator (IAC) within their hosted server instance (P-Instance) to create a scoped application with the augmented capability. The end-user associated with the P-Instance provides definitional material to the IAC and initiates generation of an integration application that may be a standalone application or a plug-in application to create the new scoped application based on the definitional material. The definitional material may include identification of a cloud service provider application for which to provide an integration application via the disclosed generation process. After initial generation, the partner may add additional code or other information to the generated artifacts. Recall, the partner may have extensive domain knowledge about a first application suite and the application generator may have built in domain knowledge about how to integrate to a cloud service provider product offering. This additional code or other information may include further "business logic," perhaps based on domain knowledge of the partner, to allow the generated application to provide the augmented functionality as desired. After the partner has completed implementation and testing of the augmented functionality in the generated application, flow continues to block 440, where partner 1 may publish the created and scoped application to the cloud provider application store (e.g., 325 of FIG. 3). As part of the process of publishing (or prior to publishing), the generated application, which now includes the augmented functionality, may go through a certification process to ensure conformance with all applicable certification criteria required for publishing.

At block 460, customer 1 may interact with the application store (e.g., 325 of FIG. 3) to obtain a copy of the scoped application from the application store such that it is available within a cloud provider server instance associated with customer 1 (e.g., C-Instance). As shown at block 470, the scoped application includes program code to provide augmented capability (e.g., scripts, and/or complied program code, etc.), documentation for installation and use, along with other requirements of certification required by the cloud service provider. In this example, the scoped application, executing within the customer's environment (e.g., C-Instance) integrates the functionality of the cloud provider helpdesk offering and the customer's CMDB which may be already active in the customer environment and from a third-party vendor. Method 400, ends at block 480 where customer 1 end-users may now access functionality of the augmented capability as provided by partner 1 within their server instance (e.g., C-Instance) along with other cloud provider product offerings available in the server instance and other products active in the customer's environment.

Figure 5:
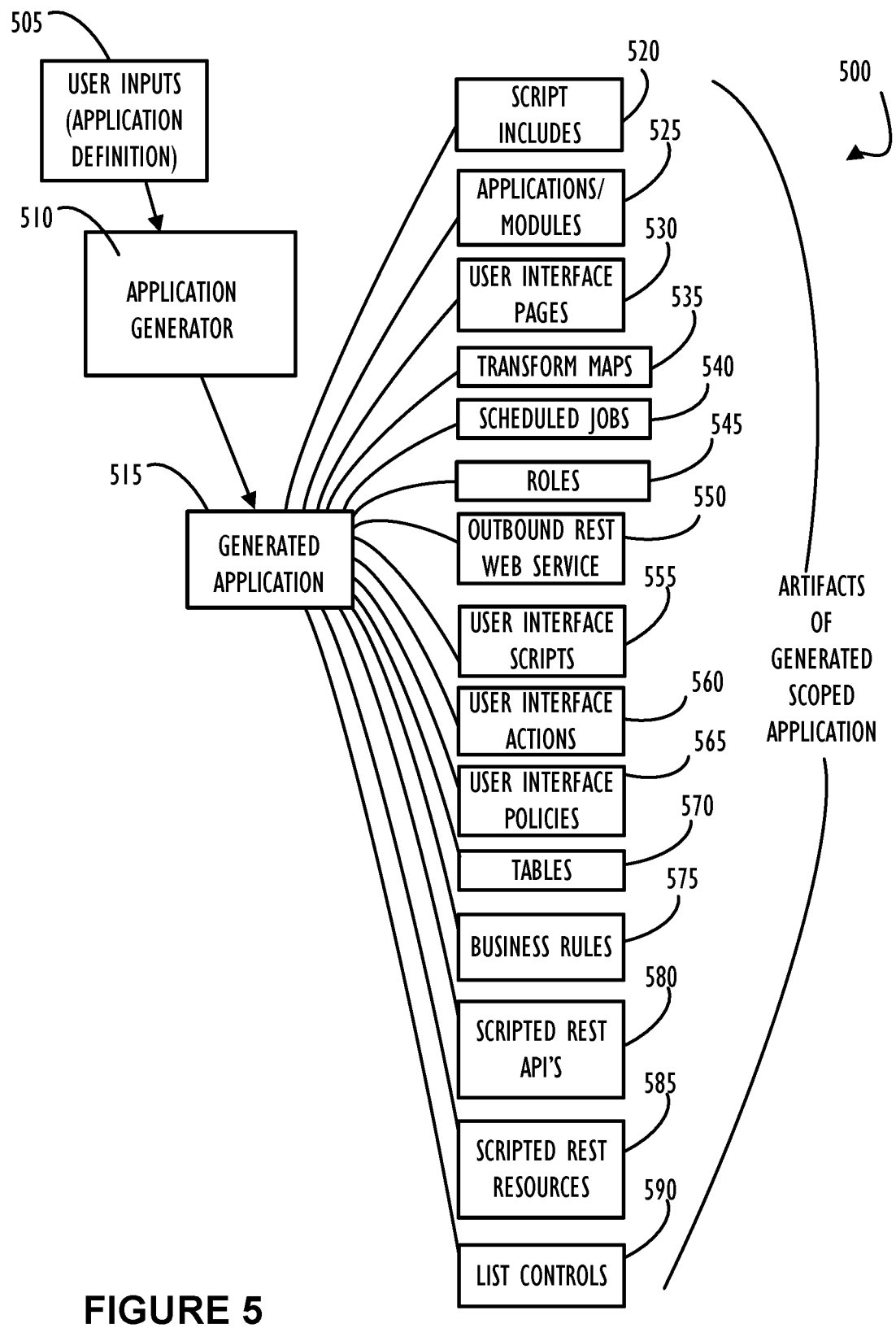
FIG. 5 illustrates a block diagram 500 of integration application generation and artifacts that may result from an integration application generation process according to one or more disclosed embodiments.

FIG. 5 illustrates a block diagram 500 of application generation and artifacts that may result from an application generation process according to one or more disclosed embodiments. Block 505 indicates that a user, for example a user in a partner instance such as P-Instance 310 of FIG. 3, inputs application definition information. Application definition information may include application parameters such as what type of integration is desired for a new application. Integration may be in the form of a plug-in to an existing application or in the form of a new application to interact with data and processes of an existing application. Application definition information may also indicate that a completely new set of capabilities may be provided. Block 510 illustrates that an application generator, for example application generator 315 of FIG. 3, takes as input the definitional information and outputs a generated application as shown at block 515. At this point, the generated application (e.g., application 320 of FIG. 3) may not be complete and may need further code, configuration, or other data supplied by an application developer having specific domain knowledge. In any case, the application generated as illustrated at block 515 will comprise a set of artifacts to assist the application developer to achieve their overall goal. This set of artifacts may include but not be limited to the types of artifacts shown in FIG. 5. Further, based on the capabilities of the generated application, generated applications may require only some of the types of artifacts shown in FIG. 5. For one embodiment, a generated application may comprise artifacts including: script-includes 520, application modules 525, user interface pages 530, transform maps 535, scheduled jobs 540, roles 545, outbound REST web service 550, user interface scripts 555, user interface actions 560, user interface policies 565, tables 570, business rules 575, scripted REST API's 580, scripted REST resources 585, and list controls 590.

Each of the types of artifacts outlined in FIG. 5 are further explained here by way of non-exhaustive examples for types of materials that may be included in each of the enumerated examples. Script-includes 520 may include application creator utilities that contain functions for a created scoped application and other necessary artifacts. In one example, script-includes 520 refers to creating script includes to store libraries of JavaScript functions and classes for use by server scripts. Each server script include may define either an object class or function. In this example, script-includes 520 run only when called by a server scripts. Application/Modules 525 may include application menus, a created scoped application (e.g., an integration scoped application), and application documents (e.g., application documentation pages). In one example, an application navigator function of the application generator (e.g., 315 of FIG. 3) provides access to all applications and modules they contain, enabling end-users to quickly find information and services. An application may be considered a group of modules, or pages, that provide related information and functionality in an instance (e.g., 310 of FIG. 3). For example, the scoped application created may contain modules for viewing an import table, transform maps, installation check list, and a support link. User interface pages 530 may include: documentation templates, for example a template user interface page that may be used during creation of the document page called in the script-include; installation checklist template, for example a template user interface page used during the creation of the incident installation checklist page called in the script-include; and/or installation checklist template for security incident, for example a template user interface page used during the creation of the security incident installation checklist page called in the script-include. User interface pages 530 may be used to create and display forms, dialogs, lists and other UI components. Transform maps 535 may include a set of field maps that determine the relationships between fields in an import set and fields in an existing cloud service provider table, such as incident or security incident. A transform map may be used to allow users to transform incoming data before it is applied to tables 570. Scheduled jobs 540 refers to automated scripts that may be performed either at a particular time, or on a recurring schedule. Roles 545 may be used to control access to features and capabilities in applications and modules. For example, after access has been granted to a role, all of the groups or users assigned to the role are granted access. An individual role may contain another role and any access grated to a role is granted to any role that contains it. Outbound REST web service 550, in one example, allows end-users to retrieve, create, update, or delete data on a web services server that supports the REST architecture. A REST message may be sent by a REST workflow activity or by using an application program interface (API). REST messages may be used in a properly configured customer environment to allow the message to communicate with REST providers on an internal network behind a customer's firewall. User interface scripts 555 may include a user interface script that runs the application creator process and initiates a call to the REST API to execute the script-include. In one example, user interface scripts provide a way to package client-side JavaScript into a reusable form, similar to how script includes store server-side JavaScript. Administrators may create user interface scripts and run them from client scripts and other client-side script objects from HTML code. User interface actions 560 may include view documentation, for example a user interface action that directs to the URL of the documentation user interface page. In one example, user interface actions 560 add buttons, links, and context menu items on forms and lists, making the user interface more interactive, customizable, and specific to user activities. User interface actions 560 may contain scripts that define custom functionality. User interface policies 565 refers to client-side logic that governs field behavior and visibility on forms. Client-side Javascript may be automatically generated that will execute on the browser to enforce policies on the form being displayed. For example, there may be a make field read-only policy that makes all fields read-only on the application documents form. Tables 570 may include an application documents table to hold the application and documentation user interface page created via the application creator. In one example, a table can "extend" another table. A table that extends another table is called a child class, and the table it extends is the parent class. Some tables are both a parent and child class because they extend and are extensions of other tables. A parent class that is not an extension of another table is called a base class. The dictionary entry for a child class only contains the fields unique to the child class. The fields inherited from the parent class belong to the dictionary entry for the parent class. This means that a child class record has values in both the child class and all of its parent classes. The full child class record is actually a collection of values from multiple tables that all share the same sys_id value. The system tracks record changes by the sys_id value and applies any change to all classes that have a record with the matching sys_id value. For example, if you delete an incident record, the system also deletes the corresponding record in the task table. Business rules 575 may include a set document user interface action, for example that sets the u_document field to the sys_id of the user interface action (the u_document field is a user interface action field). In one example, a business rule is a server-side script that runs when a record is displayed, inserted, updated, or deleted, or when a table is queried. End-users may use business rules to accomplish tasks like automatically changing values in form fields when certain conditions are met, or to create events for email notifications and script actions. Scripted REST API's 580 may include an application creator integration service, for example a REST API to execute script-include from within the user interface script. In one example, the Scripted REST APIs 580 feature allows application developers to build web service APIs. The developer can define service endpoints, query parameters, and headers for a scripted web service API, as well as scripts to manage the request and response. Scripted REST APIs 580 generally follow the REST architecture, but may be customized to use different conventions. Script REST resources 585 may include an application creator integration service or application integration, for example a resource of REST API that contains code to run the action script-include function. In one example, a scripted REST API resource is used to define the HTTP method, the processing script, and to override settings from the parent service. List controls 590 may include user application documents, for example a list control to emit the NEW button and disable cell edits. For example, users with the appropriate roles can configure various aspects of lists. For example, users can add or remove columns from a list and change the order in which the columns appear in the list. Users may also hide controls and define access conditions by role for existing controls. Configuration changes may apply to all users globally.

In some cases it may be desirable to "hide" code within the generated artifacts. For example, code may be obfuscated, encrypted, read/write protected or the like to prevent alteration or inspection of some generated portions. By hiding, protecting and preventing alteration of code in this manner, portions of the generated code may assist in conformance with scoping criteria, certification criteria, protection of intellectual property rights, or other valuable considerations.

Figure 6:
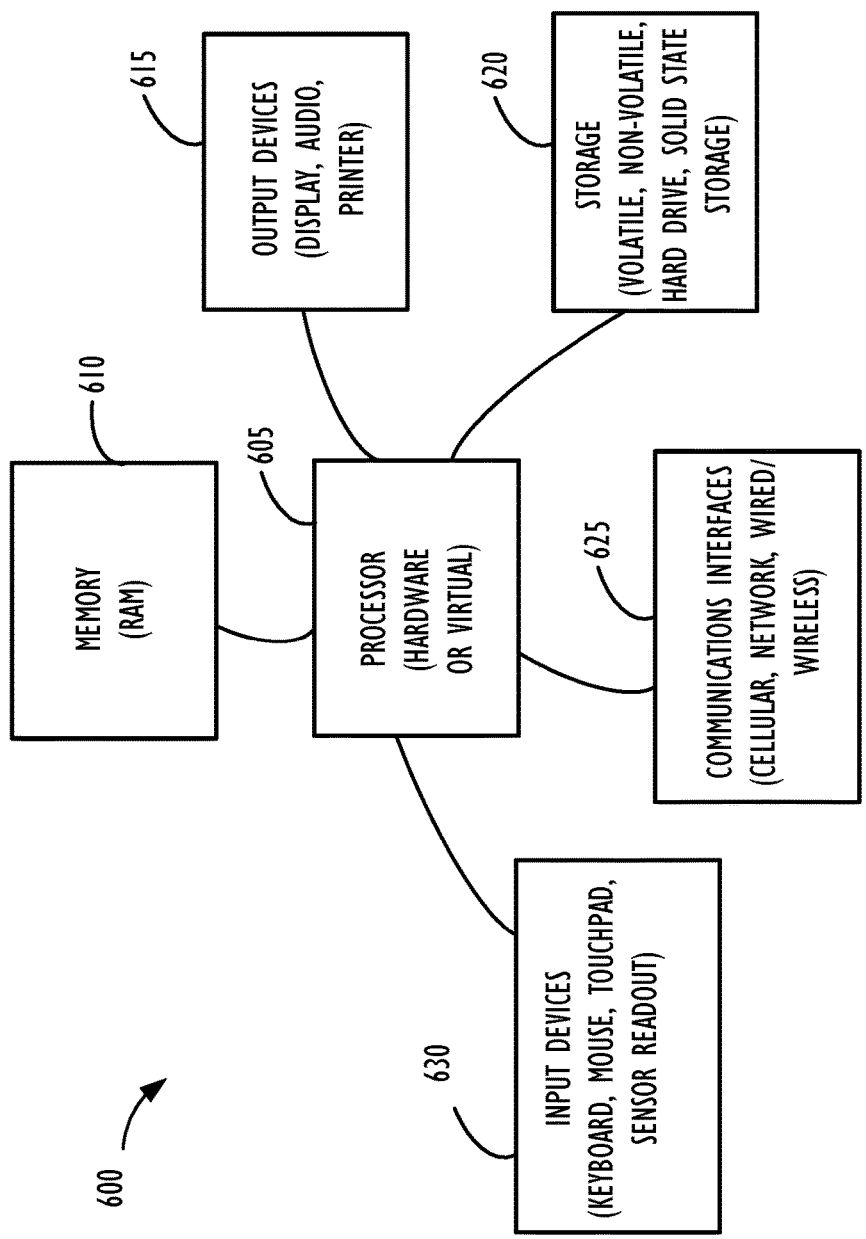
FIG. 6 illustrates a high-level block diagram 600 of a processing device (computing system) that may be used to implement one or more disclosed embodiments.

FIG. 6 illustrates a high-level block diagram 600 of a processing device (computing system) that may be used to implement one or more disclosed embodiments (e.g., service provider cloud infrastructure 305, client devices 104A-104E, server instances 112, data centers 206A-B, etc.). For example, computing device 600 illustrated in FIG. 6 could represent a client device or a physical server device and include either hardware or virtual processor(s) depending on the level of abstraction of the computing device. In some instances (without abstraction) computing device 600 and its elements as shown in FIG. 6 each relate to physical hardware and in some instances one, more, or all of the elements could be implemented using emulators or virtual machines as levels of abstraction. In any case, no matter how many levels of abstraction away from the physical hardware, computing device 600 at its lowest level may be implemented on physical hardware. As also shown in FIG. 6, computing device 600 may include one or more input devices 630, such as a keyboard, mouse, touchpad, or sensor readout (e.g., biometric scanner) and one or more output devices 615, such as displays, speakers for audio, or printers. Some devices may be configured as input/output devices also (e.g., a network interface or touchscreen display). Computing device 600 may also include communications interfaces 625, such as a network communication unit that could include a wired communication component and/or a wireless communications component, which may be communicatively coupled to processing element 605. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 6, processing device 600 includes a processing element such as processor 605 that contains one or more hardware processors, where each hardware processor may have a single or multiple processor cores. In one embodiment, the processor 605 may include at least one shared cache that stores data (e.g., computing instructions) that are utilized by one or more other components of processor 605. For example, the shared cache may be a locally cached data stored in a memory for faster access by components of the processing elements that make up processor 605. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 6, the processing elements that make up processor 605 may also include one or more other types of hardware processing components, such as graphics processing units (GPU), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory medium configured to store various types of data. For example, memory 610 may include one or more storage devices 620 that comprise a non-volatile storage device and/or volatile memory. Volatile memory, such as random access memory (RAM), can be any suitable non-permanent storage device. The non-volatile storage devices 620 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 620 may be used to store overflow data if allocated RAM is not large enough to hold all working data. The non-volatile storage devices 620 may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600.

A user interface (e.g., output devices 615 and input devices 630) can include a display, positional input device (such as a mouse, touchpad, touchscreen, or the like), keyboard, or other forms of user input and output devices. The user interface components may be communicatively coupled to processor 605. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 600 may comprise other components well known in the art, such as sensors, powers sources, and/or analog-to-digital converters, not explicitly shown in FIG. 6.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system, comprising:
a processor; and
a memory accessible by the processor, wherein the memory stores instructions that, when executed by the processor, cause the processor to perform actions comprising:
executing a first computational instance, wherein the first computational instance is communicatively coupled to a remotely executing partner application via a network interface;
receiving an indication of a primary application and an integration-type for the primary application;
generating a set of artifacts for a secondary application, wherein the secondary application is a scoped application having a target functionality based on the primary application and the integration-type, wherein the secondary application is configured to execute within a hosted customer instance executing an instance of the primary application and provide for integration between the primary application and a third application;
wherein the secondary application is configured to interface with the primary application through a public interface of the primary application and to integrate between the primary application and the third application by communicating information between the primary application and the third application; and
wherein the secondary application includes the actions and graphic elements for providing the target functionality.

2. The system of claim 1, wherein the set of artifacts comprises control data and access control lists that define a scope of the secondary application according to certification specifications.

3. The system of claim 1, wherein the set of artifacts comprises a plurality of tables storing data for a user interface page, wherein the data comprises an installation checklist template.

4. The system of claim 1, wherein the set of artifacts comprises one or more script-includes that contain functions for the secondary application and other artifacts for compliance with certification specifications.

5. The system of claim 1, wherein the primary application comprises a help desk application and the third application comprises a third party application executing in a customer network.

6. The system of claim 5, wherein the third party application executing in the customer network comprises a configuration management data base (CMDB).

7. The system of claim 5, wherein the help desk application comprises an incident management application or a security incident application.

8. The system of claim 1, wherein the set of artifacts comprises data for one or more user interface pages for compliance with certification specifications.

9. A multi-instance cloud system, comprising:
a processor; and
a memory, accessible by the processor, wherein the memory stores instructions that, when executed by the processor, cause the processor to perform actions comprising:
determining that an integration application creator functionality exists on a partner instance;
identifying a plurality of artifacts generated by the integration application creator functionality;
generating a partner integration application configured to execute on a customer instance, wherein the partner integration application is scoped based at least on the plurality of artifacts and with limited access to a plurality of system resources; and
enabling the generated partner integration application to function on the customer instance according to a scope of the generated partner integration application based at least on the limited access to the plurality of system resources.

10. The multi-instance cloud system of claim 9, wherein the plurality of artifacts comprises control data and access control lists that define the scope of the generated partner integration application according to certification specifications.

11. The multi-instance cloud system of claim 9, wherein the plurality of artifacts comprise a plurality of tables storing data for a user interface page, wherein the data comprises an installation checklist template.

12. The multi-instance cloud system of claim 9, wherein the plurality of artifacts comprises one or more script-includes that contain functions for the generated partner integration application and other artifacts for compliance with certification specifications.

13. The multi-instance cloud system of claim 9, wherein the generated partner integration application is configured to integrate between a help desk application and a third party application executing in a customer network.

14. The multi-instance cloud system of claim 13, wherein the third party application executing in the customer network comprises a configuration management data base (CMDB).

15. The multi-instance cloud system of claim 13, wherein the help desk application comprises an incident management application or a security incident application.

16. The multi-instance cloud system of claim 9, wherein the plurality of artifacts comprises one or more user interface pages for compliance with certification specifications.

17. A method, comprising:
receiving an indication of a primary application and an integration-type for a generated scoped integration application executing in a first computational instance of a multi-instance cloud computing system;
generating a set of artifacts for the generated scoped integration application, the set of artifacts configured for a target functionality based on the primary application and the integration-type, wherein the generated scoped integration application is configured to execute within a hosted customer instance executing an instance of the primary application and provide for integration between the primary application and another application; and
receiving additional input for the set of artifacts, the additional input defining integration information for the another application,
wherein the generated scoped integration application is configured to interface between the another application and the primary application, the generated scoped integration application interfacing with the primary application through a public interface of the primary application.

18. The method of claim 17, wherein the set of artifacts comprise a plurality of tables storing data for a user interface page, wherein the data comprises an installation checklist template.

19. The method of claim 18, wherein the primary application comprises a help desk application and wherein the another application comprises a third party application executing in a customer network.

20. The method of claim 19, wherein the help desk application comprises an incident management application or a security incident application.

* * * * *